(12) United States Patent
Malmström

(10) Patent No.: US 6,283,484 B1
(45) Date of Patent: Sep. 4, 2001

(54) BRAKING DEVICE

(76) Inventor: Sven Malmström, Frennarps Bygata 146, S-302 44 Halmstad (SE)

( * ) Notice: Subject to any disclaimer, the term of this patent is extended or adjusted under 35 U.S.C. 154(b) by 0 days.

(21) Appl. No.: 09/402,246

(22) PCT Filed: Mar. 26, 1998

(86) PCT No.: PCT/SE98/00544

§ 371 Date: Oct. 1, 1999

§ 102(e) Date: Oct. 1, 1999

(87) PCT Pub. No.: WO98/43591

PCT Pub. Date: Oct. 8, 1998

(30) Foreign Application Priority Data

Apr. 1, 1997 (SE) .................................................. 9701170

(51) Int. Cl.[7] .................................................. B62M 1/00
(52) U.S. Cl. ................ 280/87.041; 188/21; 188/2 F; 135/67; 280/1.5; 280/43; 280/47.34
(58) Field of Search ................ 188/19, 21, 29, 188/2 F; 135/67, 85; 280/1.5, 43, 47.34, 87.041

(56) References Cited

U.S. PATENT DOCUMENTS

| 1,917,440 | * | 7/1933 | Finkbeiner et al. | 135/67 |
|---|---|---|---|---|
| 4,029,311 | * | 6/1977 | Chanslor et al. | 272/70.3 |
| 4,094,330 | * | 6/1978 | Jong | 135/67 |
| 4,211,309 | * | 7/1980 | Ruggiero | 188/83 |
| 4,384,713 | | 5/1983 | Deutsch et al. . | |
| 4,461,471 | * | 7/1984 | Brastow | 272/70.3 |
| 4,765,355 | * | 8/1988 | Kent | 135/67 |
| 4,962,781 | * | 10/1990 | Kanbar | 135/65 |
| 5,020,560 | * | 6/1991 | Turbeville | 135/67 |
| 5,172,715 | * | 12/1992 | Webb | 135/67 |
| 5,224,717 | * | 7/1993 | Lowen | 280/1.5 |
| 5,311,880 | * | 5/1994 | Lancaster et al. | 128/782 |
| 5,647,602 | * | 7/1997 | Nevin | 280/87.021 |
| 5,692,762 | * | 12/1997 | Obitts | 280/87.05 |
| 5,716,063 | * | 2/1998 | Doyle et al. | 280/87.05 |
| 5,730,255 | * | 3/1998 | Helmers | 188/19 |
| 5,794,639 | * | 8/1998 | Einbinder | 135/67 |
| 5,803,103 | * | 9/1998 | Haruyama | 135/67 |
| 5,927,441 | * | 7/1999 | Luo | 188/19 |

FOREIGN PATENT DOCUMENTS 1270221  6/1963  (DE) .

* cited by examiner

Primary Examiner—Robert J. Oberleitner
Assistant Examiner—Benjamin A Pezzlo
(74) Attorney, Agent, or Firm—Antonelli, Terry, Stout & Kraus, LLP

(57) ABSTRACT

A brake system for a wheeled walker frame having two walker frame legs with two telescopically adjustable frame tubes, of which one frame tube supports in its upper region a handle and a brake lever and the other is provided in its lower region with a brake device for braking a wheel. A telescopically adjustable brake rod is disposed within the frame tubes, between the brake lever and the brake device, and includes two parallel rods of which one is interconnected with the brake lever and the other is interconnected with the brake device. An axial longitudinal adjustment of the frame tubes to the desired vertical position synchronously causes a corresponding alteration of the length of the brake rod. At least one device is provided for locking the frame tubes and the parallel rods.

12 Claims, 3 Drawing Sheets

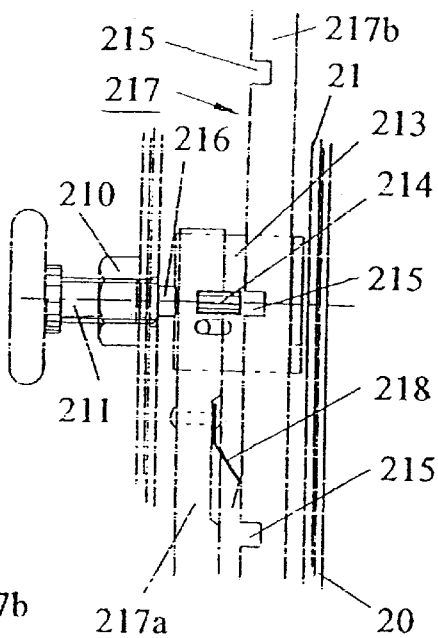
FIG 2a
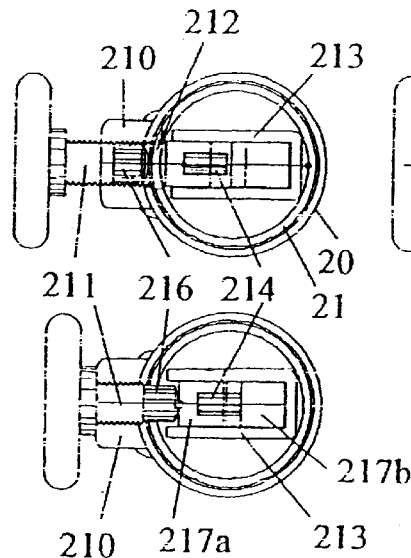
FIG 2b
FIG 2c
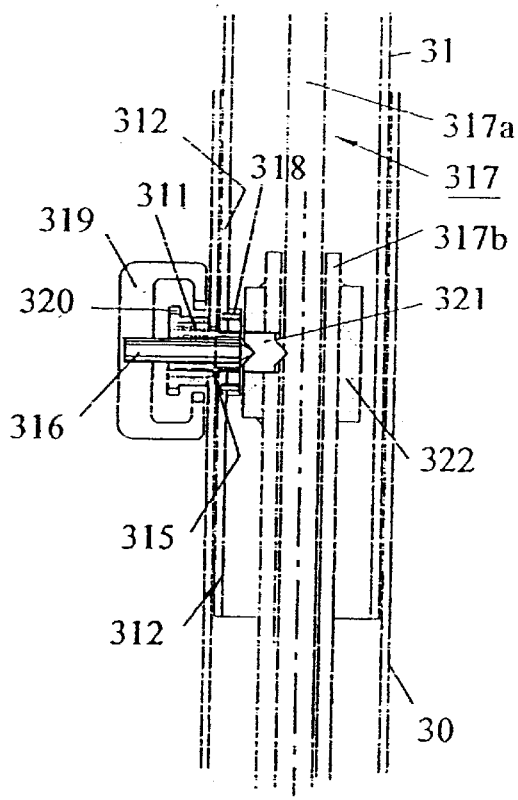
FIG 3a
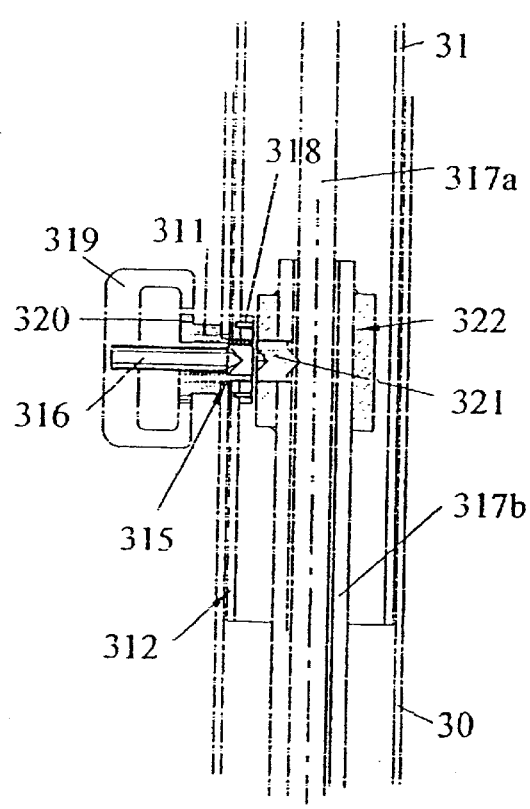
FIG 3b

BRAKING DEVICE

FIELD OF THE INVENTION

The present invention relates to a brake system for a wheeled walker.

BACKGROUND OF THE INVENTION

Wheeled walker frames are normally constructed from metal tubing, which results in constructions which are stable, durable and relatively light. According to the legislation of most European countries, such a wheeled walker frame must satisfy certain requirements in order to be employed within public medical care. It should have as hygienic an exterior as possible, ie. clean, smooth surfaces, few dirt pockets and few projecting parts. It should further be provided with a brake for each handle which in turn must be capable of being adjusted in the vertical direction in as simple a manner as possible, in which event the adjustment of the brake should preferably take place synchronously, or employing very simple measures. A glance at prior art constructions shows that the transmission of the braking force from the handle to the brake substantially takes place via three principles: a) a flexible cable, b) a strap or lanyard of textile, or c) a metal rod, all disposed wholly or partly outside the metal tubing. These prior art brake systems suffer from drawbacks. The flexible cable forms loops which may catch in projecting objects such as handles on furniture. The same applies to the textile strap which must be adjusted after a movement of the handle, and also the metal rod located outside the tubing can catch in extraneous objects. For all three types, it is a common feature that they are unattractive and difficult to keep clean, which is of importance since wheeled walker frames are lent out to different patients during a period of convalescence, and therefore must be carefully cleaned before being passed on to the next user.

SUMMARY OF THE INVENTION

The object forming the basis of the present invention is to obviate or at least reduce the above outlined drawbacks inherent in prior art wheeled walker frames.

This object is solved according to the present invention.

The present invention makes possible the enclosure of the brake system in the frame tubing, which eliminates the drawbacks inherent in prior art wheeled walker frames with projecting parts and brake cables, etc.

BRIEF DESCRIPTION OF THE DRAWINGS

Embodiments of the present invention will be described in greater detail hereinbelow, with reference to the accompanying drawings, in which:

FIG. 2a shows a section through a part of one leg of a wheeled walker frame with a slightly deviating form of brake rod and locking device.

FIG. 2b shows a cross section through the leg of the wheeled walker frame with the parts in the displacement position.

FIG. 2c shows a similar cross section to FIG. 2b, with the parts in the locked position.

FIG. 3a shows a longitudinal section through parts of a third embodiment, with the parts in the displacement position.

FIG. 3b shows a similar cross section to FIG. 3a with the parts in the locked position.

DETAILED DESCRIPTION

Figure 1:
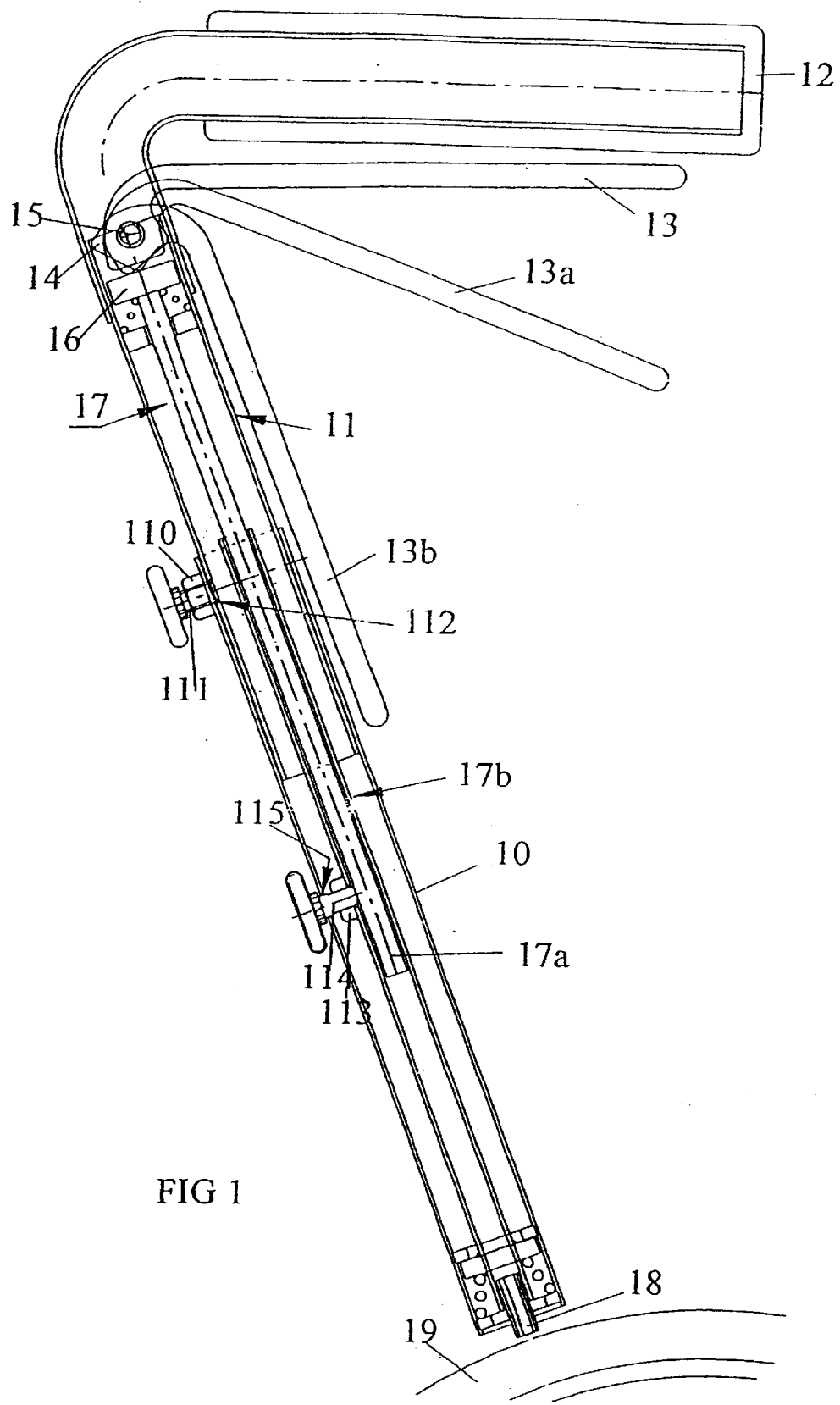
FIG. 1 shows a section through one leg of a wheeled walker frame which has two telescopic tubes with lockable and extensible brake rods.

With reference to FIG. 1, an outer frame tube 10 constitutes, together with an inner frame tube 11, carrying elements for a handle 12 and a brake lever pivotal about a shaft 15, the handle being shown in three different positions, a braking position 13, a neutral position 13a and a locked position 13b. The brake lever is provided with a pressure surface 14 for contact with a spring-biased pressure plate 16 which is applied on the upper end of a rod 17a which constitutes the one component of an extensible brake rod 17. The other component is a tube 17b in which the rod 17a runs and in whose lower end a brake device 18 in the form of a threaded pin is screwed in, the pin, on braking, being urged into abutment against a walker frame wheel 19 (partly shown on the Drawing). Since it should be possible to adapt a wheeled walker frame to both tall and short people, the handle must be capable of being raised or lowered and, after adjustment, be securely fixed in either position. To this end, there is provided, at the upper region of the outer frame tube 10, an interiorly threaded aperture 110, for example a sleeve nut in which a screw 111, provided with a thumb wheel, may be twisted in and out. In the inner position, both of the telescopic frame tubes are mutually locked, since the screw has penetrated into one of the holes 112 which are stepwise punched out in the inner frame tube 11.

A similar locking arrangement with sleeve nut 113 and screw 114 is mounted at the tube 17b. When the screw 114 is threaded in, the rod 17a is clamped fast against the tube 17b. The screw passes through an oval hole 115 punched in the outer frame tube 10. The length of the hole is slightly greater than the diameter of the screw 114, in order for the brake rod 17 in the locked position to be able to be pressed downward far enough for the brake device 18 to have a braking effect against the walker frame wheel 19.

When the vertical position of the handle is altered, the procedure is as follows. Both of the screws 111 and 114 are backed off and threaded out so far that the telescopic units, i.e. the rods 17a and 17b, as well as the frame tubes 10 and 11 are free and thereby mutually displaceable. The handle is raised or lowered until a suitable hole 112 in the frame tube 11 is in register with the screw 111, which is then tightened into the hole 112, thereby fixing the frame tubes to one another. Thereafter the screw 114 is tightened, so that the rod 17a is locked against the tube 17b.

FIGS. 2a, b, c illustrate a slightly different version of the present invention. Here, the telescopic frame tubes are designated 20 and 21. The mutual fixing in the vertical direction of these elements is the same as in the embodiment according to FIG. 1, i.e. a screw 211 runs in a sleeve nut 210. The screw 211 is provided with a Stub shaft 216 which, on vertical fixing, passes through a hole 212 in the inner frame tube 21. The brake rod 217 is, in this embodiment, composed of two rods 217a and 217b of square profile. The rods are axially displaceable in relation to one another and are locked at predetermined distances in that the rod 217a (in FIG. 2a the left-hand rod) is provided with a pin 214. In the right-hand rod 217b, there are provided slots 215 at the same distance and the same spacing as the holes 212 in the inner frame tube 21. With the aid of the screw 211, the stub shaft 216 is forced against the rod 217a which is, in such instance, displaced against the rod 217b and the pin 214 engages in the slot 215. The rods are thereby axially fixed. A U-bent plate 213 ensures the lateral positioning of the rods. The locking of the adjustable parts thus takes place synchronously with the aid of the screw 211 provided with the thumb wheel, the stub shaft 216 and the pin 214.

The procedure on adjustment of the vertical position of the handle is simple. The screw 211 is backed off as far as shown in FIG. 2b, i.e. completely out of the hole 212. Then, the pin 214 has, under the action of a spring 218, released its engagement with the slot 215 and the rods 217a and 217b are axially displaceable in relation to one another. The height of the handle can therefore be adjusted and, by screwing in the screw 211, the frame tubes are locked at the same time as the pin 214 enters into engagement with the slot 215. The length and design of the stub shaft 216 are such that a certain radial play exists between the brake rod and the frame tube, in order for the brake rod to be displaced without excessive friction and without jeopardizing the braking function which, after all, presupposes a few millimetres'vertical movement.

In the two described embodiments, the vertical positions of the handle were limited to a predetermined number. In the embodiment described below in connection with FIGS. 3a and 3b, this adjustment is stepless.

The inner frame tube 31 is provided with a longitudinal slot 312 which is slightly longer than the total extent of the vertical adjustment. In the outer frame tube 30, there is a hole 315 of the same diameter as the width of the slot 312. The locking of the two frame tubes takes place by clamping between a nut 318 located within the inner frame tube, and a head disposed on the screw 311, the periphery 320 of the head being toothed and constituting a grip for a thumb wheel or knob 319 which is rotatable about a shaft 316 journalled in a hole in the screw 311. The free end of the shaft 316 is designed as a cross bit with whose help an arrest screw 321 can be rotated in a thread disposed in the tube 317b of the brake rod 317. Since this, for reasons of weight, should be as thin-walled as possible, a socket 322 is disposed around the end of the tube and the thread is disposed for the greater part in this socket. Also in this embodiment, the locking of the adjustable parts takes place synchronously with the aid of the screw 311, the shaft 316 and the arrest screw 321.

The locking mechanism functions as follows. Starting from the locked position according to FIG. 3a, the arrest screw 321 is first backed off so that the parts of the brake rod are released. Thereafter, the knob 319 is drawn outwards until it comes into engagement with the toothing 320 of the screw 311. The screw can then be released and the clamping pressure ceases and the handle may be placed in the desired vertical position. The locking takes place most simply in the reverse sequence. First, the frame tubes are clamped together, the knob 319 is pressed in and the arrest screw is tightened so hard that the elements of the brake rod are locked in the axial direction.

Figure 4A:
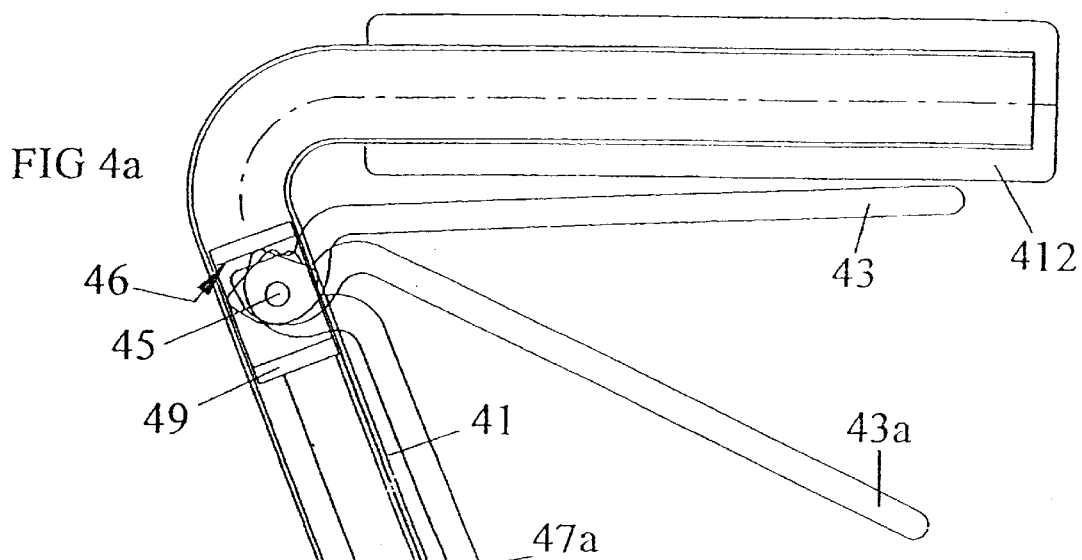
FIG. 4a shows a section through one leg of a wheeled walker frame according to yet a further embodiment, the brake rod being of the drawing action type.
Figures 4B, 4C:
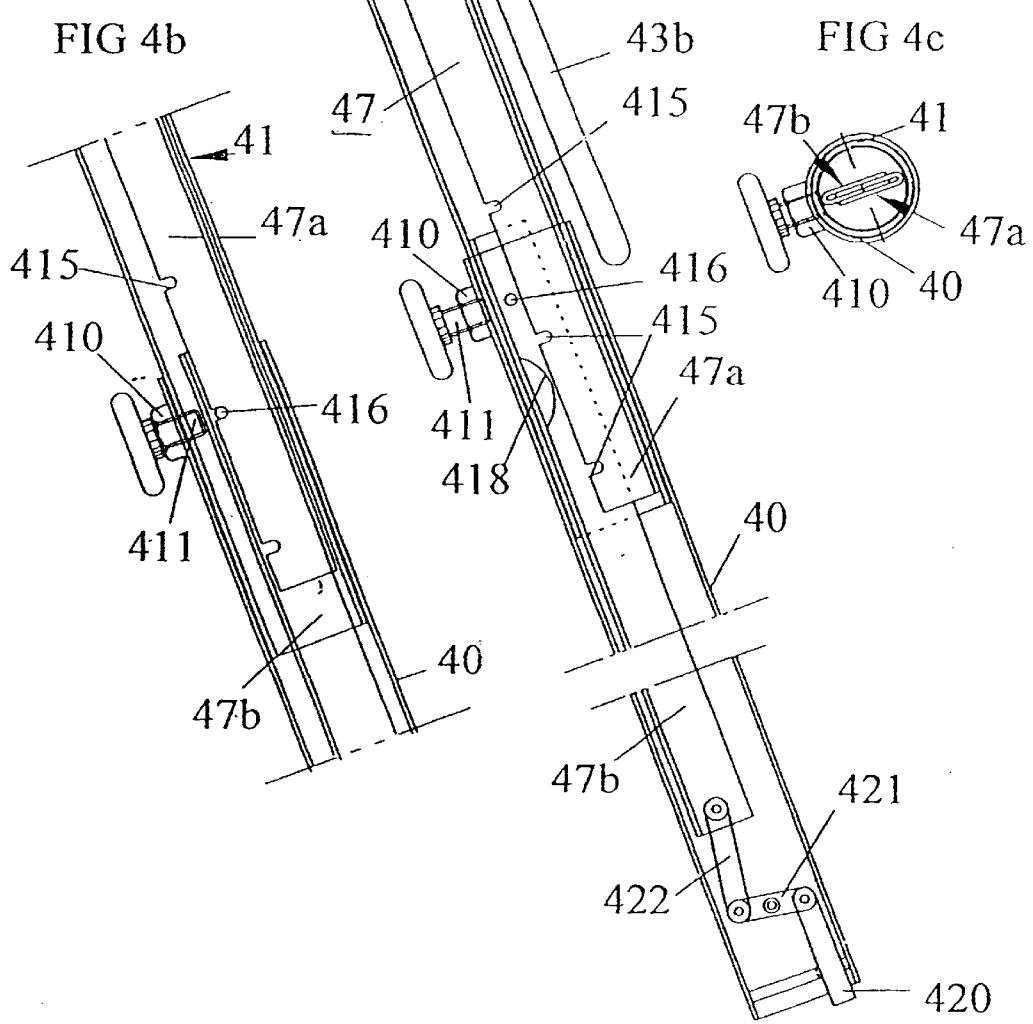
FIG. 4b shows a section through a part of one leg of a wheeled walker frame with the parts in the locked position.
FIG. 4c shows a cross section through the parts of FIG. 4b.

The embodiments of the present invention described in the foregoing have a compression brake rod, to which the present invention is not restricted. The brake rod may also operate by a drawing action. Such a variation is illustrated in FIGS. 4a–4c.

The brake lever,.which in the previously described examples, had a compression action on the brake rod must, in the present embodiment, act in the drawing direction instead. Thus, the brake lever 43 (see FIG. 4a) acts against a compression surface 46, located above its pivot axis 45, on an ear 49 which is connected to a rail 47a which in turn, together with a similar rail 47b, forms the brake rod 47.

The rails run in one another and can be mutually locked axially via a pin 416 disposed in the rail 47b and which engages in recesses 415 in the other rail 47a. This engagement may take place when the rails are pressed together radially. The mechanism for this locking operation is similar to that illustrated in FIG. 2. A screw 411, provided with a knob, is rotatable in a thread in a sleeve nut 410 fixedly welded to the outer frame tube 40. Roughly halfway backed-off, the screw releases the contact with the inner frame tube 41. The rails of the brake rod are then held apart under the action of a thin leaf spring 418. The handle 412 may thus now be raised or lowered to the desired level. When the screw 411 is located in register with a hole in the inner frame tube, the screw is threaded in so far that the pin 416 is in engagement with a recess 415. The length of the screw is adapted such that no radial "clamping pressure" occurs, but that a certain play exists when the screw is fully tightened. As a result, the brake rod is not impeded by friction in its movement, either between the screw and the rail or between the rail and the inner frame tube on braking.

Since the braking operation takes place by a drawing action, the brake device 420 is of a different concept than the previously described variations. The drawing force from the brake rod is transmitted via a drawing linkage 422 and a rocker arm 421 as compression force to the brake device. The advantage in a drawing action brake rod is that it may be permitted to be considerably more lightweight in dimensions than a compression action brake rod, since there is no risk of outward bending in a drawing action brake rod. Thus it is conceivable to manufacture the rails 47a and 47b of plastic.

What is claimed is:

1. A wheeled walker comprising first and second walker frame legs, each leg including:

an upper frame tube having an upper end;

a lower frame tube having a lower end, the lower frame tube engaging the upper frame tube while permitting telescopic longitudinal movement therebetween;

a handle on the upper frame tube upper end;

a wheel rotatably mounted on the lower frame tube lower end;

a brake lever connected to the upper frame tube upper end adjacent the handle and normally assuming a non-braking position while being pivotable to a braking position;

a brake device connected to the lower frame tube lower end and adapted to engage and brake the wheel;

a brake rod extending within the upper frame tube and the lower frame tube and including an upper rod member and a lower rod member engaging the upper rod member while permitting telescopic longitudinal movement therebetween, the upper rod member having an upper end connected with the brake lever, the lower rod member having a lower end connected with the brake device; and locking means extending into the upper frame tube and the lower frame tube to engage the brake rod, said locking means being adapted for movement between an unlocking position, permitting longitudinal movement between the upper frame tube and the lower frame tube and longitudinal movement between the upper rod member and the lower rod member, and a locking position, prohibiting longitudinal movement between the upper frame tube and the lower frame tube and longitudinal movement between the upper rod member and the lower rod member such that pivoting of the brake lever from the non-braking position to the braking position moves the brake rod longitudinally within the upper and lower frame tubes, causing the brake device to engage the wheel.

2. A wheeled walker as claimed in claim 1, wherein the locking means is adapted to lock the upper and lower frame tubes and the upper and lower rod members synchronously.

3. A wheeled walker as claimed in claim 2, wherein pivoting of the brake lever from the non-braking position to the braking position moves the brake rod downwardly within the upper and lower frame tubes, bringing the brake device into engagement with the wheel.

4. A wheeled walker as claimed in claim 2, wherein:
   pivoting of the brake lever from the non-braking position to the braking position moves the brake rod upwardly within the upper and lower frame tubes; and
   the brake device includes a drawing linkage and a rocker arm which are responsive to upward movement of the brake rod to bring the brake device into engagement with the wheel.

5. A wheeled walker as claimed in claim 1, wherein pivoting of the brake lever from the non-braking position to the braking position moves the brake rod downwardly within the upper and lower frame tubes, bringing the brake device into engagement with the wheel.

6. A wheeled walker as claimed in claim 1, wherein:
   pivoting of the brake lever from the non-braking position to the braking position moves the brake rod upwardly within the upper and lower frame tubes; and
   the brake device includes a drawing linkage and a rocker arm which are responsive to upward movement of the brake rod to bring the brake device into engagement with the wheel.

7. A wheeled walker comprising first and second walker frame legs, each leg including:
   an upper frame tube having an upper end;
   a lower frame tube having a lower end, the lower frame tube engaging the upper frame tube while permitting telescopic longitudinal movement therebetween;
   a handle on the upper frame tube upper end;
   a wheel rotatably mounted on the lower frame tube lower end;
   a brake lever connected to the upper frame tube upper end adjacent the handle and normally assuming a non-braking position while being pivotable to a braking position;
   a brake device connected to the lower frame tube lower end and adapted to engage and brake the wheel;
   a brake rod extending within the upper frame tube and the lower frame tube and including an upper rod member and a lower rod member engaging the upper rod member while permitting telescopic longitudinal movement therebetween, the upper rod member having an upper end connected with the brake lever, the lower rod member having a lower end connected with the brake device; and
   a single locking device adapted for movement between an unlocking position, permitting longitudinal movement between the upper frame tube and the lower frame tube and longitudinal movement between the upper rod member and the lower rod member, and a locking position, prohibiting longitudinal movement between the upper frame tube and the lower frame tube and longitudinal movement between the upper rod member and the lower rod member such that pivoting of the brake lever from the non-braking position to the braking position moves the brake rod longitudinally within the upper and lower frame tubes, causing the brake device to engage the wheel.

8. A wheeled walker as claimed in claim 7, wherein the single locking device is adapted to lock the upper and lower frame tubes and the upper and lower rod members synchronously.

9. A wheeled walker as claimed in claim 8, wherein pivoting of the brake lever from the non-braking position to the braking position moves the brake rod downwardly within the upper and lower frame tubes, bringing the brake device into engagement with the wheel.

10. A wheeled walker as claimed in claim 8, wherein:
    pivoting of the brake lever from the non-braking position to the braking position moves the brake rod upwardly within the upper and lower frame tubes; and
    the brake device includes a drawing linkage and a rocker arm which are responsive to upward movement of the brake rod to bring the brake device into engagement with the wheel.

11. A wheeled walker as claimed in claim 7, wherein pivoting of the brake lever from the non-braking position to the braking position moves the brake rod downwardly within the upper and lower frame tubes, bringing the brake device into engagement with the wheel.

12. A wheeled walker as claimed in claim 7, wherein:
    pivoting of the brake lever from the non-braking position to the braking position moves the brake rod upwardly within the upper and lower frame tubes; and
    the brake device includes a drawing linkage and a rocker arm which are responsive to upward movement of the brake rod to bring the brake device into engagement with the wheel.

* * * * *